US012325040B2

(12) United States Patent
Guagliano et al.

(10) Patent No.: US 12,325,040 B2
(45) Date of Patent: Jun. 10, 2025

(54) SYSTEM FOR THE DEPOSITION OF MICROPARTICLES (71) Applicant: POLITECNICO DI MILANO, Milan (IT)

(72) Inventors: Mario Guagliano, Pavia (IT); Stefano Monti, Cornegliano Laudense (IT); Carlo Bonadonna, Milan (IT); Mauro Paganelli, Monza (IT); Sara Bagherifard, Milan (IT); Gabriele D'Antona, Varese (IT)

(73) Assignee: POLITECNICO DI MILANO, Milan (IT)

( * ) Notice: Subject to any disclaimer, the term of this patent is extended or adjusted under 35 U.S.C. 154(b) by 184 days.

(21) Appl. No.: 17/909,507

(22) PCT Filed: Mar. 4, 2021

(86) PCT No.: PCT/IB2021/051801
§ 371 (c)(1),
(2) Date: Sep. 6, 2022

(87) PCT Pub. No.: WO2021/176388
PCT Pub. Date: Sep. 10, 2021

(65) Prior Publication Data
US 2023/0112751 A1 Apr. 13, 2023

(30) Foreign Application Priority Data

Mar. 5, 2020 (IT) .................. 102020000004678

(51) Int. Cl.
B29C 64/209 (2017.01)
B05B 5/025 (2006.01)
(Continued)

(52) U.S. Cl.
CPC ............ B05B 5/0255 (2013.01); B05B 5/043 (2013.01); B29C 64/141 (2017.08);
(Continued)

(58) Field of Classification Search
None
See application file for complete search history.

(56) References Cited

U.S. PATENT DOCUMENTS 2,796,832 A * 6/1957 Pritchard .................. B41F 7/30
427/144
2,851,307 A * 9/1958 Sedlacsik .................. B05B 5/03
118/621
(Continued)

FOREIGN PATENT DOCUMENTS

EP  3196003 A1  7/2017

OTHER PUBLICATIONS

International Search Report and Written Opinion dated Jun. 2, 2021 from counterpart International Patent Application No. PCT/IB2021/051801.

Primary Examiner — Jethro M. Pence
(74) Attorney, Agent, or Firm — SHUTTLEWORTH & INGERSOLL, PLC; Timothy J. Klima (57) ABSTRACT A system for the deposition of microparticles comprises at least one launch unit configured to individually accelerate and convey a succession of microparticles in the direction of a work surface. The launch unit has a tubular shape defining a flow channel for the succession of microparticles and extends preferably linearly between an inlet end interfaceable with a device for feeding microparticles and an outlet end which can face the work surface. The launch unit comprises a charging portion, proximal to the inlet end, configured to generate an electric field of electrification adapted to electrically charge the succession of microparticles and an acceleration portion, proximal to the outlet end,
(Continued)

configured to generate an electric field of acceleration adapted to accelerate the succession of microparticles towards the outlet end.

22 Claims, 3 Drawing Sheets

(51) Int. Cl.
- *B05B 5/043* (2006.01)
- *B29C 64/141* (2017.01)
- *B33Y 10/00* (2015.01)
- *B33Y 30/00* (2015.01)

(52) U.S. Cl.
CPC .......... *B29C 64/209* (2017.08); *B33Y 10/00* (2014.12); *B33Y 30/00* (2014.12)

(56) References Cited

U.S. PATENT DOCUMENTS

| | | | | |
|---|---|---|---|---|
| 2,858,798 | A * | 11/1958 | Sedlacsik | B05B 5/10 239/700 |
| 2,894,691 | A * | 7/1959 | Sedlacsik | B05B 5/03 239/296 |
| 2,920,679 | A * | 1/1960 | Sittel | D04H 1/00 19/301 |
| 2,966,880 | A * | 1/1961 | Gengenbach | B05B 5/04 118/671 |
| 2,985,135 | A * | 5/1961 | Hickerson | B41J 2/43 178/25 |
| 3,735,925 | A * | 5/1973 | Benedek | B05B 5/03 118/621 |
| 4,801,086 | A * | 1/1989 | Noakes | B05B 5/0255 239/707 |
| 5,074,083 | A | 12/1991 | Kanno et al. | |
| 6,350,609 | B1 * | 2/2002 | Morozov | B05B 5/0255 422/50 |
| 6,787,313 | B2 * | 9/2004 | Morozov | B82Y 30/00 435/7.1 |
| 7,455,250 | B2 * | 11/2008 | Muljono | B05B 5/035 239/707 |
| 8,276,539 | B2 * | 10/2012 | Kawakami | B05B 5/0255 118/712 |
| 9,211,551 | B2 * | 12/2015 | Stark | B05B 5/047 |
| 9,962,720 | B2 * | 5/2018 | St. Peter | B05B 5/03 |
| 10,207,276 | B2 * | 2/2019 | Bartko | G01N 1/2202 |
| 10,245,681 | B2 * | 4/2019 | Koerber | B23K 26/342 |
| 10,730,239 | B1 * | 8/2020 | Glukhoy | B29C 64/245 |
| 11,046,578 | B2 * | 6/2021 | Birmingham | B05B 5/0255 |
| 11,285,498 | B2 * | 3/2022 | Ackerman | B05B 7/0466 |
| 11,649,525 | B2 * | 5/2023 | Birmingham | B05B 16/00 257/24 |
| 11,702,522 | B2 * | 7/2023 | Bai | C08J 3/12 264/15 |
| 11,773,491 | B2 * | 10/2023 | Gandhiraman | H05H 1/2406 427/569 |
| 11,845,100 | B2 * | 12/2023 | Liu | B01J 2/16 |
| 11,986,911 | B2 * | 5/2024 | Shuck | B23K 9/0956 |
| 2003/0150739 | A1 * | 8/2003 | Morozov | B01J 19/0046 205/133 |
| 2008/0003374 | A1 * | 1/2008 | Borra | B05D 1/04 118/621 |
| 2009/0127357 | A1 * | 5/2009 | Suda | A23L 3/3589 220/608 |
| 2009/0266924 | A1 * | 10/2009 | Pui | B05B 1/14 239/696 |
| 2014/0255615 | A1 * | 9/2014 | Danner | B05B 5/087 118/621 |
| 2018/0290381 | A1 | 10/2018 | Volkov | |
| 2020/0063289 | A1 * | 2/2020 | Kuster | D01D 5/0076 |
| 2020/0156153 | A1 * | 5/2020 | Kovalchuk | B29C 64/153 |
| 2020/0368848 | A1 * | 11/2020 | Birmingham | B23K 26/1464 |
| 2022/0118467 | A1 * | 4/2022 | Ackerman | B05B 5/043 |
| 2023/0191347 | A1 * | 6/2023 | Reichel | B01F 35/7547 366/101 |
| 2023/0405934 | A1 * | 12/2023 | Ogihara | B29C 64/209 |

* cited by examiner

SYSTEM FOR THE DEPOSITION OF MICROPARTICLES

This application is the National Phase of International Application PCT/IB2021/051801 filed Mar. 4, 2021 which designated the U.S.

This application claims priority to Italian Patent Application No. 102020000004678 filed Mar. 5, 2020, which applications are incorporated by reference herein.

The present invention makes reference in particular to the technical sector of industrial manufacturing processes for the production of objects by 3D printing.

Specifically, the present invention relates to a system for the deposition of microparticles that is usable for additive manufacturing processes.

The term additive manufacturing refers to a specific type of production process that enables three-dimensional objects to be obtained by producing a succession of superimposed layers which represent successive adjacent cross sections of the object.

The known systems for carrying out additive manufacturing processes typically operate by fusing or sintering the microparticles that are used to produce the individual layers, thus rendering necessary the presence of specific devices capable of imparting heat to the microparticles during the deposition thereof or directly to the product as it is progressively formed.

Despite ensuring a good level of precision in both dimensional terms and in terms of the resolution of the individual deposited layers, the known systems have a series of limitations that considerably reduce their productivity and the range of products that can be made.

First of all, the high temperatures necessary to obtain the fusion of the materials used to make the products entail a high consumption of energy and also the occurrence of considerable residual tensile thermal stresses, which impair the characteristics, in particular the mechanical characteristics, of the final product.

Furthermore, the instruments typically used to generate the fusion (laser light sources, plasma sources . . . ) pose a non-negligible degree of danger and their use requires the presence of highly qualified, suitably trained personnel.

A further problem of the known systems is represented by the limited production volumes that can be obtained, as each layer is typically produced by moving the heat source point by point in a sequential manner, thus making it travel progressively along the entire deposited layer.

In order to remedy the problems identified above, systems called cold spray systems have been developed which do not require the fusion of the materials used to make the product, but rather exploit the principle of supersonic particle deposition.

According to this technique, the expansion of a gas at medium-high pressure (typically comprised in the interval between 15 bar and 50 bar) is exploited to accelerate solid microparticles at supersonic speeds, directing them by means of suitable nozzles so that they strike a sublayer capable of being plastically deformed.

In the impact, the solid particles adhere to the sublayer, forming therewith a homogeneous, compact phase that grows progressively with the successive impacts, sequentially producing each layer of the final product which is desired to be obtained.

Cold spray systems enable high quality products to be obtained, as they do not require any input of thermal energy, or in any case, in the absence of fusion phenomena, they do not pose the risk of producing portions damaged by residual thermal stresses.

On the contrary, the products made with these systems at most show compression stresses which improve their mechanical strength.

Furthermore, cold spray systems can also be employed to deposit temperature-sensitive materials or ones having melting temperatures that are too high for common additive manufacturing systems.

However, even cold spray systems are not devoid of disadvantages and they have a series of limitations that result in poor performance and reduces their actual usability.

In particular, the known cold spray systems show limited dimensional precision and low resolution, due to the impossibility of adequately focusing the stream of particles delivered through the nozzles under the thrust of the pressurised gas, unless special masks are used which, however, complicate their application.

Furthermore, precisely the need to have high-pressure gas cylinders generates considerable problems in terms of structural complexity and the costs of producing the system, as well as considerable problems related to user safety.

In this context, the technical task at the basis of the present invention is to propose a system for the solid state deposition of microparticles that overcomes at least some of the aforementioned drawbacks of the prior art.

In particular, it is an object of the present invention to provide a system for the deposition of microparticles that is simultaneously characterised by high speed and precision and is capable of achieving high quality manufacturing.

The stated technical task and the specified objects are substantially achieved by a system for the deposition of microparticles comprising the technical features disclosed in one or more of the appended claims.

According to the present invention, a system for the deposition of microparticles is shown which comprises at least one launch unit configured to individually accelerate and convey a succession of microparticles in the direction of a work surface.

The launch unit has a substantially tubular shape defining a flow channel for the succession of microparticles extending, preferably linearly, between an inlet end interfaceable with a device for feeding microparticles and an outlet end which can face the work surface.

In detail, the launch unit comprises a charging portion and an acceleration portion.

The charging portion, proximal to the inlet end, is configured to generate an electric field (of electrification) adapted to electrically charge the succession of microparticles.

The acceleration portion, proximal to the outlet end, is configured to generate an electric field (of acceleration) adapted to accelerate the succession of microparticles towards the outlet end.

Advantageously, the proposed system enables the microparticles to be accelerated at supersonic speeds without the use of pressurised gas, obtaining a high dimensional precision despite performing a cold deposition.

The subject matter of the present invention also relates to a machine for additive manufacturing processes comprising a system for the deposition of microparticles, a device for feeding microparticles and a work surface facing the outlet end of the at least one launch unit.

In particular, the system is of the type described herein and has an inlet end to which the microparticles are fed by the feeding device and an outlet end through which the microparticles accelerated by the system are deposited on the work surface, without requiring the use of instruments for the fusion or sintering of the microparticles.

Advantageously, the machine for additive manufacturing processes thus combines the advantages of cold deposition systems (high quality structural characteristics of the products produced along with high deposition rates), while at the same time maintaining, however, the advantages of the classic systems (high manufacturing precision), as the particles are accelerated individually and not in a stream by means of pressurised gas.

The subject matter of the present invention further relates to a method for the deposition of microparticles, comprising the steps of:
- setting up a system for the deposition of microparticles having one or more of the features described herein;
- feeding a succession of microparticles to the inlet end of the at least one launch unit;
- individually retaining each microparticle in the charging portion;
- electrically charging the microparticle retained in the charging portion;
- generating an electric field capable of accelerating the charged microparticle;
- releasing the charged microparticle and accelerating it along the flow channel in the direction of the outlet end.

The subject matter of the present invention further relates to method for carrying out additive manufacturing processes, comprising the steps of:
- setting up a machine for additive manufacturing processes having one or more of the features described herein;
- acquiring an image identifying a three-dimensional object;
- carrying out a slicing step on the image so as to divide the three-dimensional object into a succession of superimposed layers;
- calculating, for each superimposed layer, a respective geometry of deposition of microparticles capable of producing that superimposed layer;
- selectively activating the plurality of launch units according to each deposition geometry so as to sequentially deposit a succession of layers of microparticles corresponding to the succession of superimposed layers.

In this manner, the product is produced layer after layer through the localised superimposition of microparticles whose geometry of deposition is defined by the selective activation of the individual launch units of the machine.

Additional features and advantages of the present invention will become more apparent from the approximate and thus non-limiting description of a preferred but not exclusive embodiment of a system for the deposition of microparticles, as illustrated in the appended drawings, in which.

In the accompanying figures, the reference number 1 generically indicates a system for the deposition of microparticles "M" in accordance with the present invention and identified hereinafter in the present description simply as the system 1.

In general, explicit reference will be made to the specific field of application of the deposition of microparticles "M" for carrying out additive manufacturing processes.

However, the present invention, in all of its structural and functional aspects, can be likewise be used for the production of further products and/or for carrying out processes requiring the deposition of microparticles "M".

By way of non-limiting example, the system 1 can also be used for the application of coatings and surface finishes, repairs, welding, shot peening processes, micromanufacturing or the deposition of plastic materials.

Structurally, the system 1 comprises at least one launch unit 2 configured to individually accelerate and convey a succession of microparticles "M" in the direction of a work surface "L", so as to make them impact against the latter at a velocity that is sufficient to make them adhere stably thereto.

In particular, adhesion occurs when the impact velocity is greater than the so-called critical velocity, which is characteristic of the material used and a function of the temperature, as well as the degree of oxidation of the microparticles "M".

At velocities lower than the critical velocity, the microparticles "M" will not adhere to the work surface "L" or to further previously deposited layers, whereas in the case of velocities much higher than the critical velocity, in particular when the erosion velocity is exceeded, the surface on which the impact occurs will undergo damage.

The launch unit 2 has a tubular shape defining a flow channel 3, inside which the succession of microparticles "M" can pass.

The flow channel 3 extends preferably linearly between an inlet end "I", interfaceable with a device 11 for feeding microparticles "M", and an outlet end "O", which can face the work surface "L".

Operatively, as will be described in greater detail below, the launch unit 2 receives the microparticles "M" and, after having separated them, accelerates them sequentially along the flow channel until they exceed the critical velocity, and then expels them in the direction of the work surface "L".

For this purpose, the flow channel 3 has a maximum cross section size (in particular a diameter if it has a circular cross section) that is sufficient to permit the passage of a single microparticle "M" at a time.

Preferably, an optimal condition of use of the system 1 envisages using it to deposit spheroidal microparticles "M" having a diameter that is sufficiently smaller than the cross section of the flow channel 3, so as to enable a smooth flow of the microparticles "M" without compromising the sequentiality of the launches.

In this manner it is possible to ensure that the microparticles "M" will be correctly conveyed one at a time along the launch unit 2, without running the risk, however, that they remain caught inside it or adhere to the lateral surfaces thereof.

It follows that the size of the flow channels 3 of the at least one launch unit 2 can be specifically designed on the basis of the dimensional characteristics of the microparticles "M" that must be deposited.

The launch unit is further divided at least into a charging portion 4 and an acceleration portion 5.

The charging portion 4 defines the part of the launch unit 2 inside which the microparticles "M" are prepared one at a 
time for the subsequent acceleration step and is located in proximity to or at the inlet end "I".

In particular, the charging portion 4 can coincide with the inlet end "I" or be separated from the latter by a further portion of the launch unit 2.

Operatively, the charging portion is configured to generate an electric field adapted to electrically charge the microparticles "M".

In other words, in the charging portion 4, an amount of charge is transferred to every microparticle "M" which is the highest possible, compatibly with the maximum charge physically withstandable based on the diameter and the nature of the particle itself, without creating destructive effects or in any case charge and/or particle instability. The transfer of the charge can be achieved, merely by way of example, by means of the so-called "point effect", contact with a charged surface or by induction, enabling a particularly fast and effective transfer of charge to the microparticles "M".

Therefore, in general, the present system 1 is capable of operating with any type of microparticle "M" able to support an electric charge. Thus, the same launch unit 2 could also be fed, in a same work session, with microparticles "M" of a different nature, for example in terms of material, size or geometries.

In order to ensure that each microparticle "M" is correctly retained in position while it is being charged, the launch unit 2 comprises a retaining device 6.

The retaining device 6 is in particular coupled to the charging portion 4 and is selectively activatable to retain a microparticle "M" inside the charging portion 4 itself.

In other words, by means of the retaining device 6 it is possible to block the flow of an individual microparticle "M" inside the charging portion 4 for the whole time necessary to transfer thereto a level of charge suitable for enabling and optimising the subsequent acceleration thereof.

Once that suitable level of charge is reached, the retaining device will then be deactivated so as to release the charged microparticle "M", which can then be conveyed towards the work surface "L" by means of the acceleration portion 5.

In accordance with one aspect of the present invention, the retaining device 6 comprises at least one selector element interposed between the charging portion 4 and the acceleration portion 5.

The selector element moves in such a way as to prevent the passage of the microparticles "M" in the flow channel 3, between a closed position wherein it is at least partially inserted inside the latter and an open position wherein it is completely extracted.

Figure 4A:
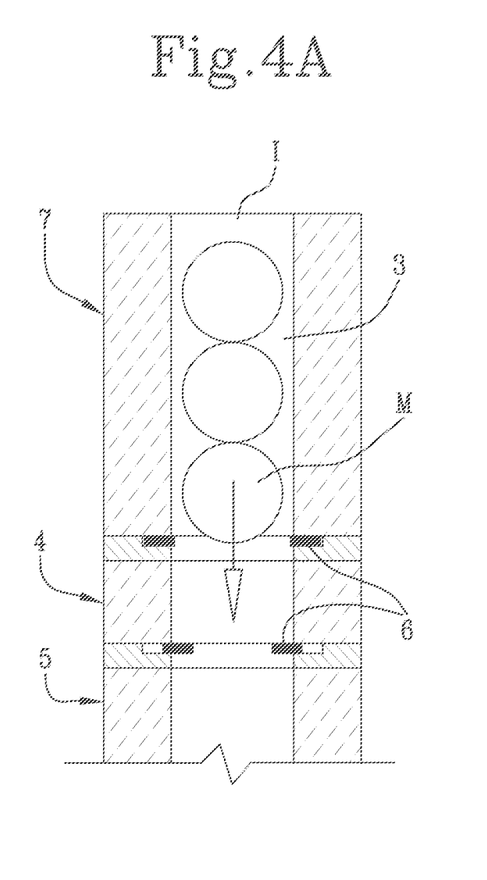
FIGS. 4A-4C show some operating steps of a method for the deposition of microparticles according to the present invention.
Figure 4B:
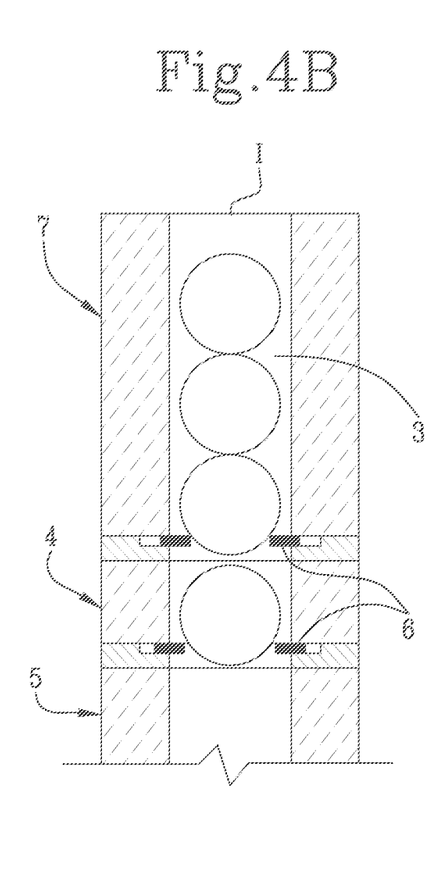
Figure 4C:
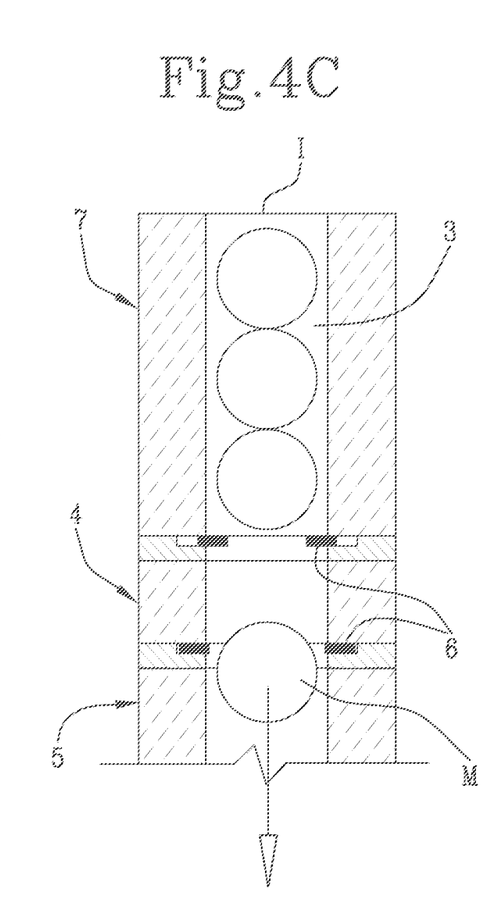

In accordance with a possible embodiment, shown in the appended FIGS. 4A-4C, the selector element is movable transversely to the flow channel 3.

Alternatively, the selector element can be hinged onto the inner wall of the flow channel 3 and the passage between the open position and the closed position takes place by rotation thereof about the hinging point.

Therefore, in the closed position, the selector element obstructs the flow conduit, preventing the passage of the microparticles "M", which are thus retained inside the charging portion 4.

Once a microparticle "M" reaches, under the action of the electric field, a suitable level of charge, the retaining device 6 is deactivated.

Consequently, the selector element is extracted from the flow conduit 3, leaving the charged microparticle "M" free to move inside it and thus to pass from the charging portion 4 to the acceleration portion 5.

The retaining device 6 further comprises an actuator, preferably a piezoelectric actuator, configured to transform an activation signal adapted to switch the selector element between the closed position and the open position.

In particular, the actuator can perform the function of converting an electric activation signal generated by a control unit connectable to the system 1 into a mechanical signal intended to move the selector element.

Optionally, the retaining device 6 can comprise a hydraulic circuit, interposed between the actuator and the selector element, and configured to transmit the activation signal from the former to the latter.

In this manner, it is possible to distance the actuator from the flow channel 3, thus optimising the management of the available spaces by amplifying the initial signal.

Optionally, the actuator can be constructed using the controlled deformation capacities of functional and smart materials (Smart Materials Actuators or SMAs).

Furthermore, this aspect is particularly relevant if the actuator is a piezoelectric actuator, as in this manner it is possible to ensure that the electric fields used to charge and accelerate the microparticles "M" do not interfere with the correct functioning thereof.

In accordance with a further aspect of the present invention, the retaining device 6 comprises a trapping device (hereinafter simply "trap"), capable of confining the microparticle "M" charge inside the charging portion 4 by means of a suitable electric potential barrier.

Optionally, the trap is created by generating equipotential spaces in the electric field by means of individually activatable electrostatic shields or individually activatable charged conductor profiles.

Optionally, the trap is created by means of a quadrupole ion trap or a Paul trap.

Again in accordance with the present aspect, the retaining device 6 further comprises an activation circuit configured to selectively activate the trap.

In general, the launch unit 2 can comprise, alternatively, a retaining device 6 of a mechanical type (i.e. created by means of the selector element controlled by the actuator) or of an electric type (i.e. created by means of the trap controlled by the activation circuit)

The launch unit 2 can also comprise both types of retaining device 6 so as to allow the user to select the more efficient one according to the specific characteristics of the microparticles "M" to be deposited and/or the specific operating conditions of the system 1, or use both at the same time in order to ensure an optimal retention of the microparticles "M" inside the charging portion 4, until they have accumulated a charge such as to enable the transfer thereof to the acceleration portion 5.

The acceleration portion 5, by contrast, defines the part of the launch unit 2 inside which the microparticles "M" are accelerated and is located in proximity to or at the outlet end "O"; the acceleration portion 4 preferably coincides with the outlet end "O".

In particular, the acceleration portion 5 is configured to generate an electric field of acceleration adapted to accelerate the microparticles "M" in the direction of the work surface "L".

The acceleration portion 5 can be preferably formed by means of an alternate succession of first tubular elements for the passage of the microparticles "M", made of electrically insulating material, and second tubular elements made of electrically conductive material.

The tubular elements are of suitable length and subjected to alternating polarity with a suitable frequency.

Optionally, the first tubular elements can be made with a free space with air, gas or a vacuum, for example by interposing spacer elements between pairs of second tubular elements so as to functionally separate the conductive parts from one another.

The launch unit 2 can further comprise a storage portion 7 defining the part of the launch unit 2 inside which the alignment of the microparticles "M" inside the flow channel 3 is promoted.

The storage portion 7 is interposed between the inlet end "I" and the charging portion 4, and preferably coincides with the inlet end "I".

The storage portion 7 is interfaceable with a device 11 for feeding microparticles "M" so as to receive therefrom a plurality of microparticles "M" and individually channel them along the flow channel 3 so as to define the succession of microparticles "M".

The storage portion 7 also performs the function of a reserve, ensuring continuity as it can store within it a predetermined quantity of microparticles "M" (depending directly on its length) upstream of the charging portion 4, but already arranged in succession.

In this manner it is possible to avoid depletions or interruptions in the production process due to possible delays or malfunctions of the feeding device.

The storage portion 7 is preferably designed to contain at least 500 microparticles "M" arranged in succession (for example stacked).

The storage portion is preferably made of insulating material 7.

The launch unit 2 can further comprise at least one conduit, not shown in the appended figures, adapted to pneumatically connect the outlet end "O" to the storage portion 7.

In this manner it is possible to exploit a gas recovery principle to favour the movement of the microparticles "M" in their passage from one portion to another of the launch unit 2.

Overall, therefore, the launch unit 2 can comprise a storage portion 7 located at the inlet end "I", an acceleration portion 5 located at the outlet end "O" and a charging portion 4 interposed between the two.

In accordance with what has been described, all of the portions can be produced by means of one or more tubular elements (made of electrically insulating or conductive material according to the structural and functional needs of the portion produced from them) which internally have respective channels arranged coaxially and cooperating so as to define the flow channel 3.

Figure 1A:
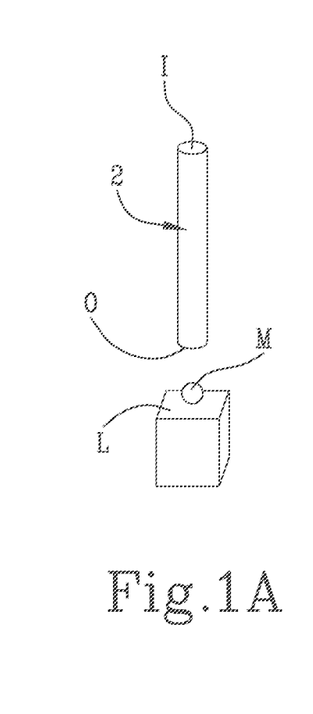
FIGS. 1A-1C show respective possible embodiments of a system for the deposition of microparticles.
Figure 1B:
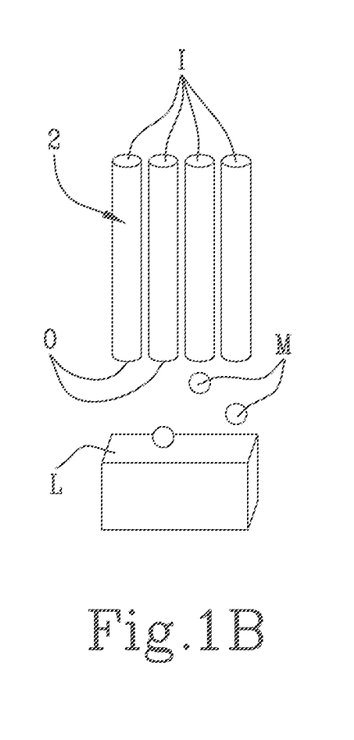
Figure 1C:
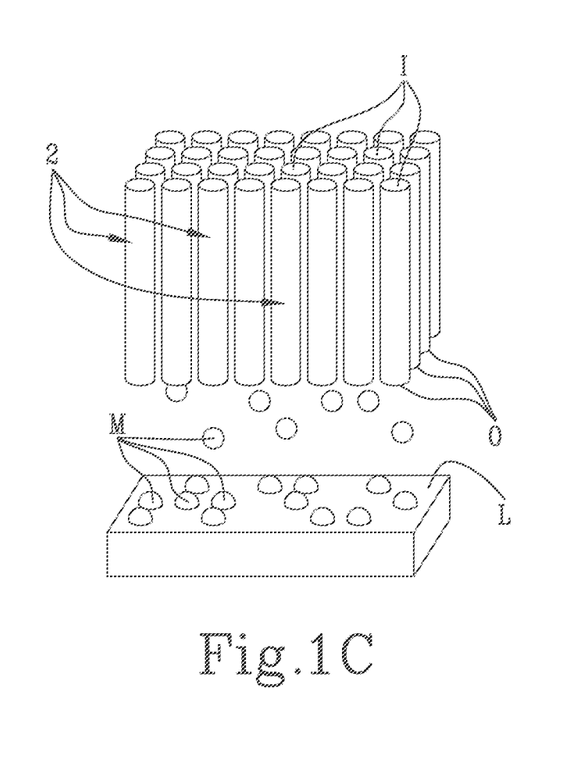
Figure 2:
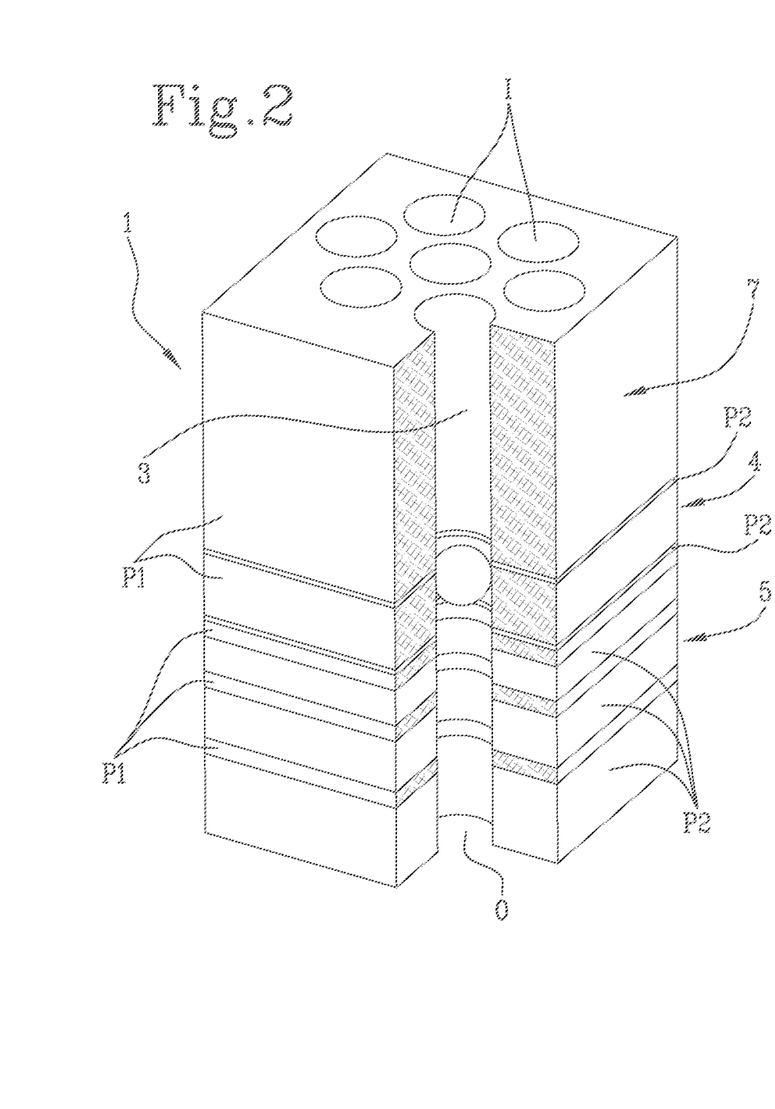
FIG. 2 shows in detail a sectional view of a possible embodiment of the system for the deposition of microparticles.

In accordance with a preferred embodiment, shown in the appended FIGS. 1B, 1C and 2, the system 1 comprises a plurality of launch units 2 arranged so as to have respective inlet ends "I" and respective outlet ends "O" arranged according to a matrix scheme.

In particular, the launch units 2 can be arranged according to a single continuous row or column (as shown in FIG. 1B), or they can be arranged so as to define a rectangular matrix of launch units 2 (as shown for example in FIG. 1C) or else be arranged according to a hexagonal matrix scheme (as illustrated by way of example in FIG. 2).

The hexagonal matrix scheme is particularly advantageous, as it enables the use of the available space to be optimised, maximising the resolution obtainable by the system 1.

Optionally, the matrix scheme can be made with a different geometry tailored to the specific application required of the system.

In general, the respective inlet ends "I" of the plurality of launch units 2 are coplanar so as to facilitate the operations of feeding the microparticles "M".

Similarly, the respective outlet ends "O" of the plurality of launch units 2 can also be coplanar and thus face a work surface "L", likewise planar, enabling the system to perform a simultaneous deposition of entire planar layers of microparticles "M".

However, if the production processes in which the system 1 is used require more complex geometries, the respective outlet ends "O" of the plurality of launch units 2 can lie in a plurality of distinct planes.

In particular, said distinct planes can be suitably adapted and oriented in such a way as to be facing the work surface "L" also and in particular when the latter is not planar, but rather has an irregular and/or curved form.

In accordance with a particular aspect of the present invention, said distinct planes comprise at least two incident planes.

It follows that in general each launch unit 2 is arranged in such a way that the flow channel 3 thereof is perpendicular at least to the portion of work surface "L" which the outlet end "O" thereof is facing.

Furthermore, when the system 1 comprises a plurality of launch units 2, the latter can be produced by alternate superimposition of perforated flat elements made of electrically conductive or electrically insulating materials in suitable thicknesses.

This composition, at least for the acceleration portion 5, emulates the one already described for the tubular elements, with the sole difference of making it possible to produce a monolithic system comprising a plurality of launch units 2 and which is thus more resistant, effective and stable.

In accordance with this aspect, the perforated flat elements are superimposed in such a way that the individual holes made in each of them are aligned (specifically, coaxial) so as to define the matrix of flow channels 3.

Therefore, as may be observed for example in FIG. 2, the system 1 can be produced by superimposing first flat elements "P1" made of electrically insulating material and second perforated flat elements "P2" made of electrically conductive material of suitable thickness.

In this case as well, as already explained with reference to the tubular elements, the insulating part can consist of a free space with air, gas or a vacuum, created by means of suitable spacing elements or systems.

In particular, each storage portion 7 of the system 1 can be made up of a single first perforated flat element "P1" which has a number of through holes equal to the number of launch units 2, while the subsequent charging portions 4 and acceleration portions 5 are obtained by alternate superimposition of first and second perforated flat elements "P1", "P2" with the first element "P1" relating to the storage portion 7 defining the number and arrangement of holes.

A further innovative and original structural feature of the present invention can conveniently be given by the presence, in the system 1 described thus far and claimed hereafter, of a suitable means for the closed-loop measurement and/or control of properties of the microparticles "M" just accelerated and deposited on the work surface "L" and/or of the operating conditions of the system 1 itself.

The closed-loop measurement and/or control means can for example be adapted to detect (or control, by means of structural elements and/or functional feedback schemes implementable with methods of a known type) one or more operating parameters of the system (such as, by way of non-limiting example: supply voltages, quantity of charge transferred to the microparticles "M", intensity of the electric fields of electrification and/or of acceleration).

From the standpoint of the structural system elements designed to perform said closed-loop control, and again making reference to the possibility of implementing feedback controls, it is possible to mention, by way of example, closed-loop measurement and/or control means comprising sensors of an optical type (video cameras, cameras, laser sensors) or of an electromagnetic type.

Advantageously, the present invention achieves the proposed objects, overcoming the aforementioned drawbacks in the prior art by providing the user with a system 1 for the deposition of microparticles "M" characterised by high dimensional precision and resolution, high deposition speeds and high efficiency of the deposition process.

These features contribute to enabling the production of products which are resistant and free of residual thermal stresses, as they are produced in the absence of fusion/sintering phenomena.

Advantageously, the particular structure of the system 1 allows the microparticles "M" to be accelerated also in the absence of gravity and/or under a vacuum condition, as it does not require the use of pressurised gas in order to work.

Furthermore, the microparticles "M" can be accelerated in any direction simply by orienting the individual launch units 2 along that direction.

Figure 3:
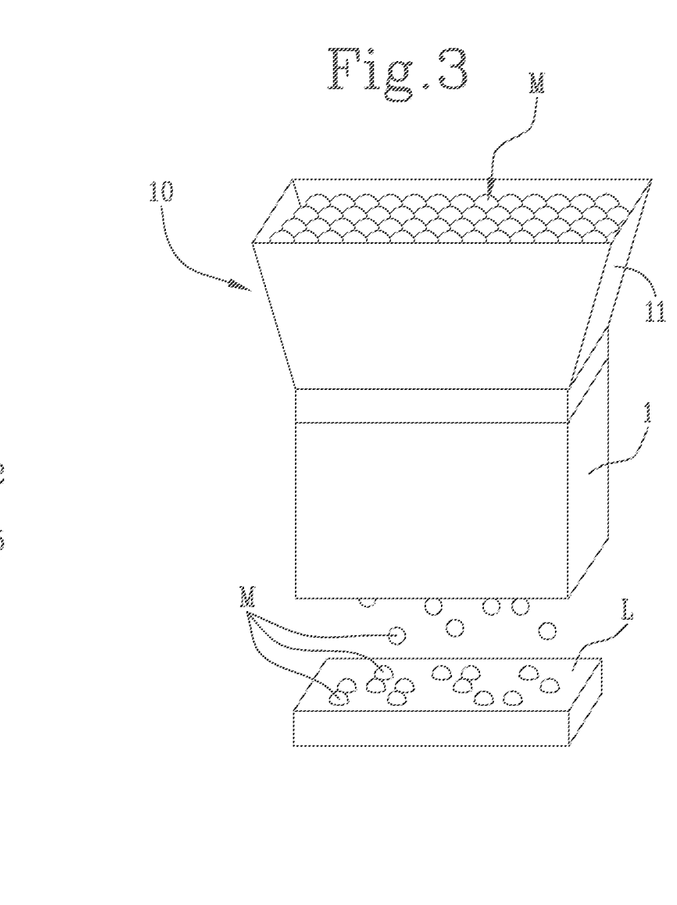
FIG. 3 schematically shows a machine for additive manufacturing processes in which a system for the deposition of microparticles according to the present invention is installed.

The present invention further relates to a machine 10 for additive manufacturing processes, schematically shown in FIG. 3.

The machine 10 comprises a system 1 for the deposition of microparticles "M", a feeding device 11 and a work surface "L".

In particular, the system 1 is constructed in accordance with what has been described above and preferably has a plurality of launch units 2.

The feeding device 11 is configured to feed microparticles "M" to the inlet end "I" of the at least one launch unit 2.

The feeding device 11 can contain spheroidal microparticles, preferably of a diameter comprised between 10 and 60 micrometres, and can be formed by a hopper or an equivalent container defining the reserve of raw materials on which the system draws.

The feeding device 11 can furthermore be fed manually or by means of suitable automatic feed systems, for example using transfer systems that convey the microparticles "M" to the feeding device 11 from processes or workstations located upstream of the latter.

The feeding device 11 can further comprise a screen which assures that the system 1 is fed solely with microparticles "M" in a range of particle sizes limited to a predetermined size that is compatible with the correct functioning of the launch units 2 (i.e. having dimensions such as to be able to flow freely and one at a time inside the flow channel 3).

The presence of the screen makes it possible, furthermore, to avoid feeding any nonconforming particle or aggregate that might subsequently constitute an obstacle to the correct functioning of the system 1, for example by blocking the flow channels 3 because of an unsuitable shape or size or, because of an excessively small size, not allowing an appropriate acceleration and effective deposition.

The feeding device 11 can further comprise vibrational systems configured to promote the correct distribution of the microparticles "M" to one or more launch units 2 and prevent the formation of aggregates or phenomena that impede the correct flow of microparticles "M" (for example the so-called "arching" phenomenon).

Such vibrational systems can be formed, for example, by means of piezoelectric or mechanical elements, or exploit acoustic and/or ultrasound actuators.

The transfer of the microparticles "M" from the feeding device 11 to the system 1 can be further favoured through the application of mechanical pressure on the mass of the microparticles "M" themselves, for example through the use of a suitable pusher member which acts upon a free surface of the plurality of microparticles "M" contained in the feeding device 11 or by means of a pressurised system.

In accordance with a further possible aspect of the present invention, the machine 10 comprises a plurality of feeding devices 11 associated with respective launch units 2 so as to feed thereto microparticles "M" having different dimensional characteristics and/or properties.

In other words, the machine 10 can comprise distinct feeding devices 11, each intended to process a specific type of microparticles "M" so as to be able to feed different microparticles "M" to distinct launch units 2 of the system 1.

In this manner it is possible to simultaneously perform the deposition of a single layer of microparticles "M" having distinct characteristics.

The work surface "L", by contrast, is facing the outlet end "O" of the at least one launch unit 2 and defines the target against which the microparticles are projected by the launch unit "L".

The work surface "L" preferably has a planar conformation, so as to provide a stable and regular base for the microparticles "M" that are progressively deposited.

However, it is likewise possible to produce a non-planar work surface "L" if the deposition process is intended for carrying out particular production or manufacturing processes that entail depositing the microparticles "M" according to specific non-planar geometries.

The machine 10 can further comprise a three-dimensional movement member (not shown in the appended figures) which is active at least on the system 1 in order to move the at least one launch unit 2 relative to the work surface "L" (and/or the work surface "L" relative to the at least one launch unit 2).

In general, the three-dimensional movement member is thus associated with the system 1 and/or with the work surface "L" so as to enable a movement thereof relative to each other.

In this manner, the launch unit 2 can thus move relative to the work surface "L" during the deposition process, thus assuring the correct positioning thereof relative to the work surface "L" itself during all the phases of its use.

Advantageously, the machine 10 described herein makes it possible to carry out rapid, precise additive manufacturing processes, while at the same time ensuring the production of products characterised by optimal structural properties.

The subject matter of the present invention further relates to a method for the deposition of microparticles "M" that can be carried out by a system 1 for the deposition of microparticles "M" in accordance with what has been described above.

As schematically shown in FIG. 4A, the method comprises feeding a plurality of microparticles "M" to the inlet end "I" of the at least one launch unit 2 of the system 1.

In particular, as already indicated, the launch unit 2 defines a flow channel 3 that allows the passage of only one microparticle "M" at a time, thus defining within it an ordered succession of microparticles "M".

Each microparticle "M" is thus individually retained inside the charging portion 4 of the launch unit 2, as shown in FIG. 4B, and electrically charged therein.

At the same time, in the acceleration portion 5 the microparticle "M" is electrically accelerated once it has accumulated a suitable charge.

Once the desired level of charge is reached, the microparticle "M" is released and accelerated, under the effect of the electric field of acceleration, along the flow channel 3 in the direction of the outlet end "I" of the launch unit 1; this step is shown in FIG. 4C.

In this manner the microparticle "M" can be deposited on the portion of the work surface "L" which the outlet end "I" is facing.

Furthermore, thanks to the possible presence in the system 1 of the suitable hardware elements mentioned above in this description, it is possible for the method implemented by the invention to comprise a step of closed-loop measurement and/or control of physical and mechanical properties of the microparticles "M" just deposited: advantageously, the closed-loop measurement and/or control step comprises in turn a sub-step of detecting and/or of controlling one or more operating parameters of the system 1 itself (and such parameters can thus be used as calculation factors for sending a feedback signal over the remaining hardware of the system 1, which in this manner can control/modify, for example, the operating characteristics of the various components designated to charge and accelerate the microparticles "M" in order to take into account the detected deposition dynamics).

In general, the optimal use of the method proposed here is for depositions of microparticles "M" for the purpose of carrying out additive manufacturing processes, wherein the microparticles "M" are individually accelerated at a velocity that is sufficient to ensure the adhesion thereof to the work surface "L" without requiring the use either of heating systems for bringing about the fusion of the microparticles "M" deposited or of pneumatic systems that use pressurised gas to accelerate them along the flow channel 3.

However, as already outlined when describing the system 1 in detail, the features of the method presented here achieve a versatile process that can be used in a wide range of situations, such as the ones already mentioned: application of coatings and surface finishes, repairs, welding, shot peening processes, micromanufacturing or the deposition of plastic materials.

The subject matter of the present invention further relates to a method for carrying out additive manufacturing processes, preferably implementable by a machine for additive manufacturing processes produced according to one or more of the technical features outlined above.

The method comprises acquiring an image identifying a three-dimensional object.

In particular, the image can be a CAD model of a three-dimensional type in which the object it is desired to produce is represented.

The drawing is then subjected to a slicing step, in which the three-dimensional object is divided into a succession of adjacent layers, each ideally having a thickness equal to that of a microparticle "M".

In this manner it is possible to produce each layer by means of a single respective deposition process.

Then a respective geometry of deposition of microparticles "M" capable of producing that specific superimposed layer is calculated for each layer.

In practical terms, the model of the object is cut into layers, thus generating a plurality of geometries of deposition which each represent the classic adjacent layers whose union distinguishes the objects made by means of the additive manufacturing processes.

In general, the geometry of the layers into which the model is sectioned is determined on the basis of the geometric characteristics (for example shape, size and arrangement) of the work surface "L", of the object itself and of the launch units 2.

By way of example, if the work surface "L" is formed by a horizontal surface, the model of the object can be advantageously cut into a succession of superimposed horizontal layers that will be sequentially deposited on the work surface "L".

Alternatively, the work surface "L" could be formed by a vertical surface; in this context the model of the object can be advantageously cut into a succession of adjacent vertical layers.

Depending on the particular configuration of the work surface "L" and the operating conditions under which the method is carried out, it is thus possible to provide for different possible geometries for cutting the layers so as to optimise the subsequent additive manufacturing process.

Once all of the deposition geometries have been determined, the plurality of launch units 2 are selectively activated on the basis of each deposition geometry, so as to sequentially deposit a succession of layers of microparticles "M" corresponding to the succession of layers.

In this manner, the three-dimensional product represented in the acquired image is progressively formed through the adhesion of successive layers of microparticles "M".

In other words, the 3D model is converted into instructions serving to control the selective activation of the launch units 2, so that for the formation of every layer, solely the launch units 2 arranged in the system 1 situated in the positions that follow the shape of the layer being deposited are activated.

Preferably, all of the microparticles "M" forming the same superimposed layer are deposited simultaneously.

The sequential deposition by adjacent launch channels with a suitable time interval is optionally provided for.

In this manner it is possible to optimise the production speed of the additive manufacturing process, as an entire layer of the three-dimensional product it is desired to produce is deposited in every charging/acceleration cycle carried out by the launch units 2 of the system 1.

The invention claimed is:

1. A system for solid state deposition of microparticles, comprising:
at least one launch unit configured to individually accelerate and convey a succession of the microparticles in a direction of a work surface, the at least one launch unit having a substantially tubular shape defining a flow channel for the succession of the microparticles extending between an inlet end, interfaceable with a device for feeding the microparticles, and an outlet end, opposite to said inlet end and which is oriented to face the work surface; the at least one launch unit comprising:
a charging portion, proximal to the inlet end, configured to generate an electric field of electrification adapted to electrically charge the succession of the microparticles;
an acceleration portion, proximal to the outlet end, configured to generate an electric field of acceleration adapted to electrically accelerate the succession of charged microparticles towards the outlet end;
a retaining device coupled to the charging portion and selectively activatable to retain each of the microparticles inside the charging portion.

2. The system according to claim 1, wherein the retaining device comprises:
   at least one selector element, interposed between the charging portion and the acceleration portion, which is movable, along a direction transversal to the flow channel, between a closed position wherein the at least one selector element is at least partially inserted inside the flow channel and an open position wherein the at least one selector element is completely extracted from the flow channel;
   an actuator, configured to generate an activation signal adapted to switch the at least one selector element between the closed position and the open position.

3. The system according to claim 2, wherein the actuator comprises a piezoelectric actuator or a smart material actuator (SMA).

4. The system according to claim 2, wherein the retaining device comprises a hydraulic circuit configured to transmit said activation signal from the actuator to the at least one selector element.

5. The system according to claim 1, wherein the retaining device comprises:
   a trapping device for trapping the microparticles, said trapping device being configured to generate electrostatic barriers or equipotential electric spaces;
   an activation circuit synchronized with the launch unit and configured to activate said trapping device.

6. The system according to claim 1, wherein the charging portion comprises a plurality of electrodes, configured to generate the electric field of electrification of the microparticles.

7. The system according to claim 1, wherein the charging portion comprises a contact or induction surface configured to generate the electric field of electrification of the microparticles.

8. The system according to claim 1, wherein the acceleration portion is produced by alternate superimposition of first tubular elements made of electrically insulating material and second tubular elements made of electrically conductive material, said second tubular elements being alternatively polarizable positively or negatively to generate said electric field of acceleration.

9. The system according to claim 1, wherein the at least one launch unit comprises a storage portion interposed between the inlet end and the charging portion and interfaceable with the device for feeding the microparticles, said storage portion being configured to individually channel a plurality of the microparticles into the flow channel, thereby defining the succession of the microparticles.

10. The system according to claim 9, wherein the storage portion is constructed with a tubular element made of insulating material.

11. The system according to claim 9, wherein the at least one launch unit comprises at least one conduit adapted to pneumatically connect the outlet end to the storage portion.

12. The system according to claim 1, wherein the at least one launch unit comprises a plurality of launch units arranged to have respective inlet ends and respective outlet ends arranged according to a matrix scheme, said plurality of launch units being selectively activatable.

13. The system according to claim 12, wherein the respective inlet ends of the plurality of launch units are coplanar and/or the respective outlet ends of the plurality of launch units are coplanar.

14. The system according to claim 12, wherein the respective outlet ends of the plurality of launch units lie in a plurality of distinct planes.

15. The system according to claim 14, wherein said distinct planes comprise at least two incident planes.

16. A machine for additive manufacturing processes comprising:
   the system for solid state deposition of the microparticles according to claim 1,
   a feeding device configured to feed the microparticles to the inlet end of the at least one launch unit,
   a work surface facing the outlet end of the at least one launch unit.

17. The machine according to claim 16, wherein the at least one launch unit includes a plurality of launch units, and further comprising a plurality of feeding devices operatively connected with respective ones of the plurality of launch units to feed the microparticles having different characteristics and/or properties to the plurality of launch units.

18. The machine according to claim 16, and further comprising a three-dimensional movement member configured to move the at least one launch unit relative to the work surface.

19. A method for deposition of microparticles comprising the steps of:
   providing a system for solid state deposition of the microparticles, comprising:
      at least one launch unit configured to individually accelerate and convey a succession of the microparticles in a direction of a work surface, the at least one launch unit having a substantially tubular shape defining a flow channel for the succession of the microparticles extending between an inlet end, interfaceable with a device for feeding the microparticles, and an outlet end, opposite to said inlet end and which is oriented to face the work surface; the at least one launch unit comprising:
         a charging portion, proximal to the inlet end, configured to generate an electric field of electrification adapted to electrically charge the succession of the microparticles;
         an acceleration portion, proximal to the outlet end, configured to generate an electric field of acceleration adapted to electrically accelerate the succession of charged microparticles towards the outlet end;
         a retaining device coupled to the charging portion and selectively activatable to retain each of the microparticles inside the charging portion;
   feeding a plurality of the microparticles to the inlet end of the at least one launch unit;
   individually retaining of the microparticles in the charging portion;
   electrostatically charging each of the microparticles retained in the charging portion by the electric field of electrification;
   generating the electric field of acceleration adapted to accelerate each of the charged microparticles;
   releasing each of the charged microparticles and accelerating each of the charged microparticles along the flow channel in a direction of the outlet end.

20. A method for carrying out additive manufacturing processes comprising the steps of:
   providing a system for solid state deposition of microparticles, comprising:
      at least one launch unit configured to individually accelerate and convey a succession of the microparticles in a direction of a work surface, the at least one launch unit having a substantially tubular shape defining a flow channel for the succession of the microparticles extending between an inlet end, interfaceable with a device for feeding the microparticles, and an outlet end, opposite to said inlet end and which is oriented to face the work surface; the at least one launch unit comprising:
- a charging portion, proximal to the inlet end, configured to generate an electric field of electrification adapted to electrically charge the succession of the microparticles;
- an acceleration portion, proximal to the outlet end, configured to generate an electric field of acceleration adapted to electrically accelerate the succession of charged microparticles towards the outlet end;
- a retaining device coupled to the charging portion and selectively activatable to retain each of the microparticles inside the charging portion;

providing a feeding device configured to feed the microparticles to the inlet end of the at least one launch unit;

providing the work surface facing the outlet end of the at least one launch unit;

acquiring an image identifying a three-dimensional object;

carrying out a slicing step on said image to divide said three-dimensional object into a succession of adjacent layers;

calculating, for each of the layers, a respective geometry of deposition of the microparticles adapted to produce said layer;

providing that the at least one launch unit includes a plurality of launch units,
- selectively activating the plurality of launch units according to each of the respective geometry of deposition to sequentially deposit a succession of layers of microparticles corresponding to the succession of adjacent layers, thereby producing said three-dimensional object.

21. The method according to claim 20, and further comprising depositing all of the microparticles producing a same layer simultaneously or with a time interval between adjacent ones of the plurality of launch units.

22. The system according to claim 1, wherein the retaining device is configured to retain single ones of the microparticles inside the charging portion.

* * * * *